United States Patent
Doria

(10) Patent No.: US 8,781,992 B2
(45) Date of Patent: Jul. 15, 2014

(54) SYSTEM AND METHOD FOR SCALED MULTINOMIAL-DIRICHLET BAYESIAN EVIDENCE FUSION

(75) Inventor: David M. Doria, Lakewood, CA (US)

(73) Assignee: Raytheon Company, Waltham, MA (US)

( * ) Notice: Subject to any disclaimer, the term of this patent is extended or adjusted under 35 U.S.C. 154(b) by 243 days.

(21) Appl. No.: 13/535,954

(22) Filed: Jun. 28, 2012

(65) Prior Publication Data

US 2014/0006334 A1  Jan. 2, 2014

(51) Int. Cl.
 *G06N 99/00* (2010.01)
 *G06N 5/04* (2006.01)

(52) U.S. Cl.
 CPC ............... *G06N 99/005* (2013.01); *G06N 5/04* (2013.01)
 USPC ............................................. 706/52; 706/45

(58) Field of Classification Search
 None
 See application file for complete search history.

(56) References Cited

PUBLICATIONS

Gilboa, et al., Dynamics of Inductive Inference in a Unified Framework, Cowles Foundation Discussion Paper No. 1811, 2011, pp. 1-44.*

* cited by examiner

*Primary Examiner* — Wilbert L Starks
(74) *Attorney, Agent, or Firm* — Christie, Parker & Hale, LLP

(57) ABSTRACT

A fusion method, implemented by one or more processors, for classifying a target having class types. The method includes: obtaining evidence from one or more classifiers, the evidence represented by scores from the one or more classifiers; representing the obtained evidence in a Bayesian context, where the Bayesian beliefs are obtained from the scores; obtaining new evidence, the new evidence represented by new scores from the classifiers; representing the obtained new evidence in an enhanced Bayesian context, where the enhanced Bayesian beliefs are obtained from the new scores; combining the scores and the new scores over multiple times; combining the evidence and the new evidence over multiple times; and using the combined scores and the combined evidence for each of the plurality of class types to classify the target.

12 Claims, 3 Drawing Sheets

SYSTEM AND METHOD FOR SCALED MULTINOMIAL-DIRICHLET BAYESIAN EVIDENCE FUSION

STATEMENT REGARDING FEDERALLY SPONSORED RESEARCH

This invention disclosure is related to a government contract. The U.S. Government has certain rights to this invention.

FIELD OF THE INVENTION

The present invention relates to a system and method for scaled multinomial-Dirichlet Bayesian evidence fusion for target classifiers and other classifier systems.

BACKGROUND

Various automatic target recognition (ATR) systems have been designed to obtain accurate predictions from target recognition results based on imagery obtained by one or more sensors. Such systems generally attempt to predict a target type from a set of target types based on sensor data and/or fused data (e.g., data from multiple sensors and/or multiple looks).

To classify the target type from a set of target types, at least one image or dataset must be processed and data must be extracted. Depending on the system requirements and/or parameters, the data may include confidence values (e.g., a percentage, estimate or likelihood) and a corresponding pose for each of the confidence values.

These systems have utilized decision level, hypothesis level and feature level fusion in attempts to determine the best ATR evidence to be fused. Decision level fusion ATR systems try to arrive at a classification decision by combining decisions from two or more ATR systems. There is an inevitable loss of information in the process of making decisions prior to fusion. Some decision level systems may determine the best ATR evidence over a range of azimuth angles for each look, but ignore consistency or relationship criteria between pose information, again with a consequent loss of information due to making decision prior to fusion. Moreover, such systems fuse ATR scores after significant portions of the data is pruned by the individual ATR systems prior to fusion. These ATR systems may prune portions of the data for reasons of efficiency, or a specific ATR system may be unable to provide accurate predictive data without pruning the data. For example, the ATR system may be designed to combine specific portions of data, but not other portions of data, such that specific portions of data are required for that specific ATR system. The ATR system may also be designed such that data must be pruned prior to fusion if the data does not have sufficient information (e.g., points of data).

Furthermore, accumulation of evidence is a long standing and much addressed area in pattern recognition. Typically, in pattern recognition, the evidence is represented as scores, usually real valued, from pattern classifiers for each possible object or category type. Bayesian methods seek to represent degrees of belief about the state of the world based on both prior knowledge and measurements. Other methods (e.g. frequentist) may not include prior probabilities in their approaches. Methods of adding evidence over time include likelihood based methods that sequentially add log likelihoods or log likelihood ratios. A known method is the Sequential Probability Ratio Test which adds log likelihood ratios and tests against a threshold. Centralized fusion methods can add weighted decisions using weights that are derived from the expected performance of the two or more classification system, with weights being defined in terms of the relative odds of the probability of correct decisions for true and false decisions. Other methods include conditional estimates of probability densities such as Markov models. However, most of these methods ignore all but the second order information contained in the variance and then propagate densities based on second order models; the Kalman filter is a well known example. Voting methods are also used for accumulation of evidence in pattern recognition. However, these above known methods simply add votes or evidence based on preliminary classifier results.

To evaluate the probability of a hypothesis, the Bayesian probabilist specifies some prior probability, which is then updated in the light of new, relevant data. The Bayesian interpretation provides a standard set of procedures and formulae to perform this calculation. Bayesian probability interprets the concept of probability as "a probability p is an abstract concept, a quantity that the invention assigns theoretically, for the purpose of representing a state of knowledge, or that the invention calculates from previously assigned probabilities," in contrast to interpreting it as a frequency or a "propensity" of some phenomenon. In the Bayesian interpretation, Bayes' theorem expresses how a subjective degree of belief should rationally change to account for evidence.

The Binomial probability density describes the probability of observing a specific number of each of two mutually exclusive outcomes as the result of an experiment or set of observations. The Multinomial theorem may be considered as the generalization of the binomial theorem to more than two possible mutually exclusive outcomes of a number of observations or experiments. The Multinomial density reduces to the binomial density in the case of exactly two possible types of outcomes or "categories". The Multinomial density assumes specific probabilities of each of the possible categories as input parameters to the density. It does not revise these probabilities when operating alone.

The Dirichlet distribution typically denoted as DIR ($\alpha$) is a family of continuous multivariate probability distributions parametrized by a vector $\alpha$ of positive real values. It is the multivariate generalization of the beta distribution. Dirichlet distributions may be used as prior distributions in Bayesian statistics to the Multinomial distribution, and in such cases the result is also a posterior Dirichlet distribution, that is, the Dirichlet distribution is the conjugate prior of the categorical distribution (a multinomial with a single observation) and multinomial distribution. In other words, the probability density function of a Dirichlet distribution returns the belief that the probabilities of K rival events are $X_i$, given that each event has been observed $\alpha_i$ times, by taking the relative proportion of each $\alpha_i$ to their total.

SUMMARY OF THE INVENTION

In some embodiments, the present invention is a fusion method, implemented by one or more processors, for classifying a target having a plurality of class types. The method includes: obtaining evidence from one or more classifiers; obtaining prior distribution of Bayesian beliefs of the class types of the target; obtaining information about recognition accuracy and capacity of each of the one or more classifiers; determining multinomial distribution model, based on the obtained evidence and the information about recognition accuracy and capacity; representing the obtained prior distribution of Bayesian beliefs by a Dirichlet distribution model; and applying the Dirichlet distribution model to the determined multinomial distribution model to obtain an enhanced Dirichlet distribution model. New evidence is then obtained and a new multinomial distribution model is determined, based on the obtained new evidence and the information about recognition accuracy and capacity.

The enhanced Dirichlet distribution model is then applied to the new multinomial distribution model to obtain a new enhanced Dirichlet distribution model; and using parameters of the new enhanced Dirichlet distribution model Bayesian confidence values are estimated for each of the plurality of class types, and the target is classified using the estimated Bayesian confidence values for each of the plurality of class types.

In some embodiments, the present invention is a fusion method, implemented by one or more processors, for classifying a target having a plurality of class types. The method includes: obtaining evidence from one or more classifiers, the evidence represented by a plurality of scores from the one or more classifiers; representing the obtained evidence in a Bayesian context, wherein Bayesian beliefs are obtained from the plurality of scores; obtaining new evidence, the new evidence represented by a plurality of new scores from the one or more classifiers; representing the obtained new evidence in an enhanced Bayesian context, wherein enhanced Bayesian beliefs are obtained from the plurality of new scores; combining the plurality of scores and the plurality of new scores over time; combining the evidence and the new evidence over multiple times; and using the combined scores and the combined evidence for each of the plurality of class types to classify the target.

The evidence may be obtained from the one or more classifiers using different observations, where the different observations are obtained from the same classifier using different field of views, from the different classifiers using the same field of view, from the one or more classifiers using same observation, or a combination thereof The recursive process between the Dirichlet and Multinomial densities can continue over multiple (i.e. two or more) observations leading to improved Bayesian belief estimates.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present system is a method and system for accumulation of information for making decisions between alternative categories in a (pattern recognition) classifier, using a Bayesian formalism that relates classifier scores to Bayesian update evidence, thus, allowing Bayesian fusion using classifier scores over time, and over multiple sensors.

In some embodiments, the present system is a method and system of fusion between a discrete number of categories or classes (e.g., something like a book or a shoebox, etc.) as resulting from a discrete number of pattern classifiers, in a pattern recognition context. The method, executed on one or more computers/processors, is applicable to fusion of evidence from single sensors over multiple observations or times, for any number of possible classes or categories of objects. The method is also applicable to fusion of evidence from multiple sensor types. The evidence discussed herein is typically represented as scores, usually real valued, from pattern classifiers for each possible object or category type. The present invention (a) represents this evidence in a Bayesian context whereby Bayesian beliefs are obtained from the scores, (b) combines scores for new evidence obtained over time, and (c) combines scores or evidence from a single or multiple sensor at a single time or over multiple times.

Figure 1:
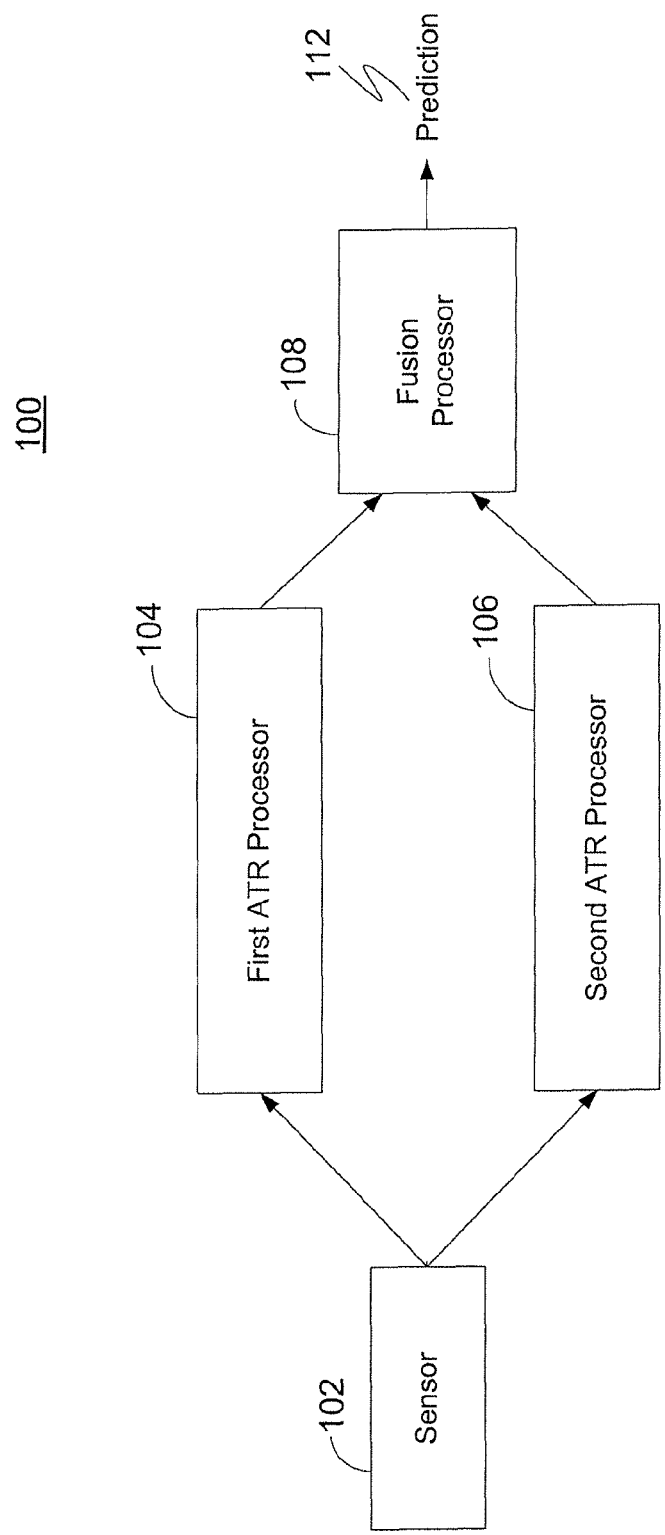
FIG. 1 is a block diagram illustrating an automatic target recognition fusion system utilizing a single sensor, according to some embodiments of the present invention.

FIG. 1 is a block diagram illustrating an automatic target recognition fusion system utilizing a single sensor, according to some embodiments of the present invention. As shown, an ATR system 100 includes a sensor 102, a first ATR processor 104, a second ATR processor 106, and a fusion processor 108. The fusion results (fusion classifications) 112 are then outputted. The sensor 102 is configured to receive radiation from a scene and relay optically processed radiation in the form of a signal to the first ATR processor 104 and the second ATR processor 106. One of ordinary skill in the art would recognize that the sensor 102 may be of various types, designed with specific materials and components based on the system's requirements. In an embodiment, the materials and components of the sensor 102 may be sensitive to radio frequency (RF) bands of the spectrum, but is not necessarily limited thereto. In other embodiments, the sensor 102 is sensitive to the visible spectrum, or any other band suitable to receive sensor information. By way of example, the sensor types comprise radar, infrared (IR), electro-optical (EO), forward looking infrared (FLIR), laser radar (LADAR), and others.

The first ATR processor 104 and the second ATR processor 106 are each configured to process and generate ATR scores based on various ATR models (e.g., ATR algorithm) implemented in the processors and other components of the ATR system 100. An article by L. M. Novak, G. J. Owirka & W. S. Brower, entitled "An Efficient Multi-Target SAR ATR Algorithm," Conference Record of the Thirty-Second Asilomar Conference on Signals, Systems and Computers (1988, pp. 3-13, Vol. 1, Institute of Electrical and Electronics Engineers), hereby incorporated by reference in its entirety, describes examples of ATR models that may be utilized in the ATR system 100. The first ATR processor 104 implements a different ATR model than the second ATR processor 106 such that the fusion of the ATR scores from the ATR processors 104, 106 provides fused scores with greater constraints. In other embodiments, the different ATR models are implemented in a single ATR processor and output distinct ATR scores based on the different ATR models.

Figure 3:
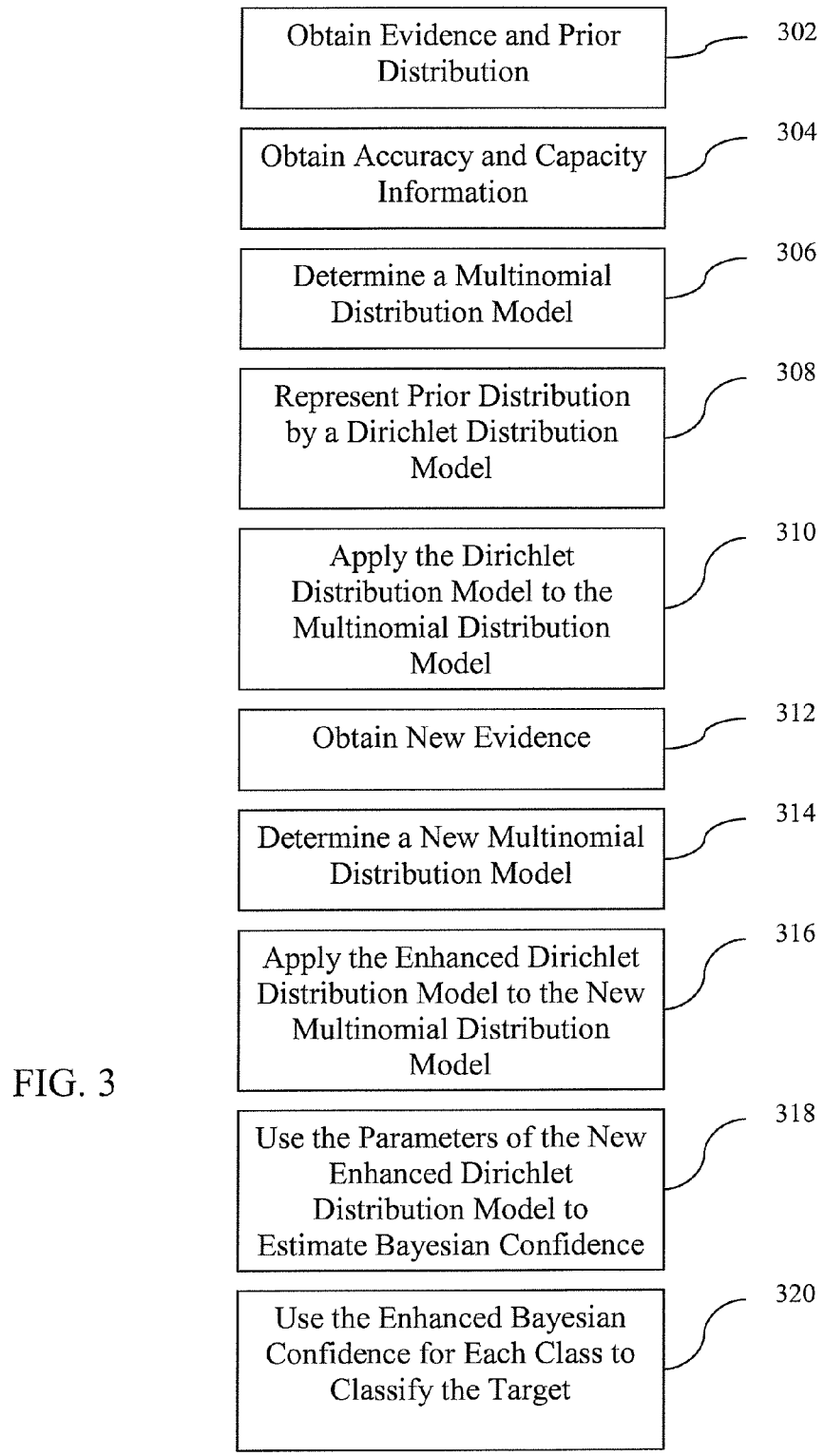
FIG. 3 is an exemplary flow diagram illustrating a method, executed on one or more processors, for classifying a target type in a set of target types from a single image, according to some embodiments of the present invention.

In some embodiments, the first ATR processor 104 and the second ATR processor 106 are configured to perform all or part of the functionality inherent in FIG. 3. Accordingly, a single sensor may obtain a single image to be processed by the first ATR processor 104 and the second ATR processor 106. Additionally, a single sensor may obtain multiple images to be processed by the first ATR processor 104 and the second ATR processor 106. In yet another embodiment, the single image or multiple images may be processed by more than two ATR processors each utilizing different ATR models. Therefore, one of ordinary skill in the art would recognize that the system illustrated in FIG. 1 is not limited to two ATR processors, but may include more than two ATR processors.

In some embodiments, the ATR processors 104, 106, for example, generate ATR scores having fine-grained results. Fine-grained is defined as a maximum of 1-degree increments in pose angles for the ATR results over 360 degrees. This mandates at least 360 scores for each target type.

The fusion processor 108 is configured to receive multiple ATR scores from at least two ATR processors and to fuse ATR scores. In an embodiment, the fusion processor 108 is configured to perform at least part of the functionality inherent in FIG. 3. In other embodiments, the multiple ATR scores are received from a single ATR processor. In this embodiment, the single ATR processor generates at least two sets of ATR scores utilizing different ATR models. The fusion processor 108 then processes the data from the ATR processors 104, 106 to obtain the fusion classification results 112.

In some embodiments, the sensor 102 generates more than one image and relays a first image to the first ATR processor 104 and a second image to the second ATR processor 106. In this scenario, the first ATR processor 104 and/or the second ATR processor 106 and/or the fusion processor 108, either together or independently, associate(s) possible detections by corresponding regions of interest. For example, one of ordinary skill in the art would recognize that the association by corresponding regions of interest may be implemented utilizing an algorithm or parts of an algorithm to be executed by one or more of the processors 104, 106, 108. Moreover, one of ordinary skill in the art would understand that the embodiment identified in FIG. 1 is not limited to obtaining only two images, but may be configured to obtain more than two images. Therefore, the ATR scores resulting from the multiple images are fused based on associated regions of interest for each azimuth angle (e.g., pose) and for each target type in the set of target types. Alternatively, fusion can be of associated target types but without estimates of pose.

Figure 2:
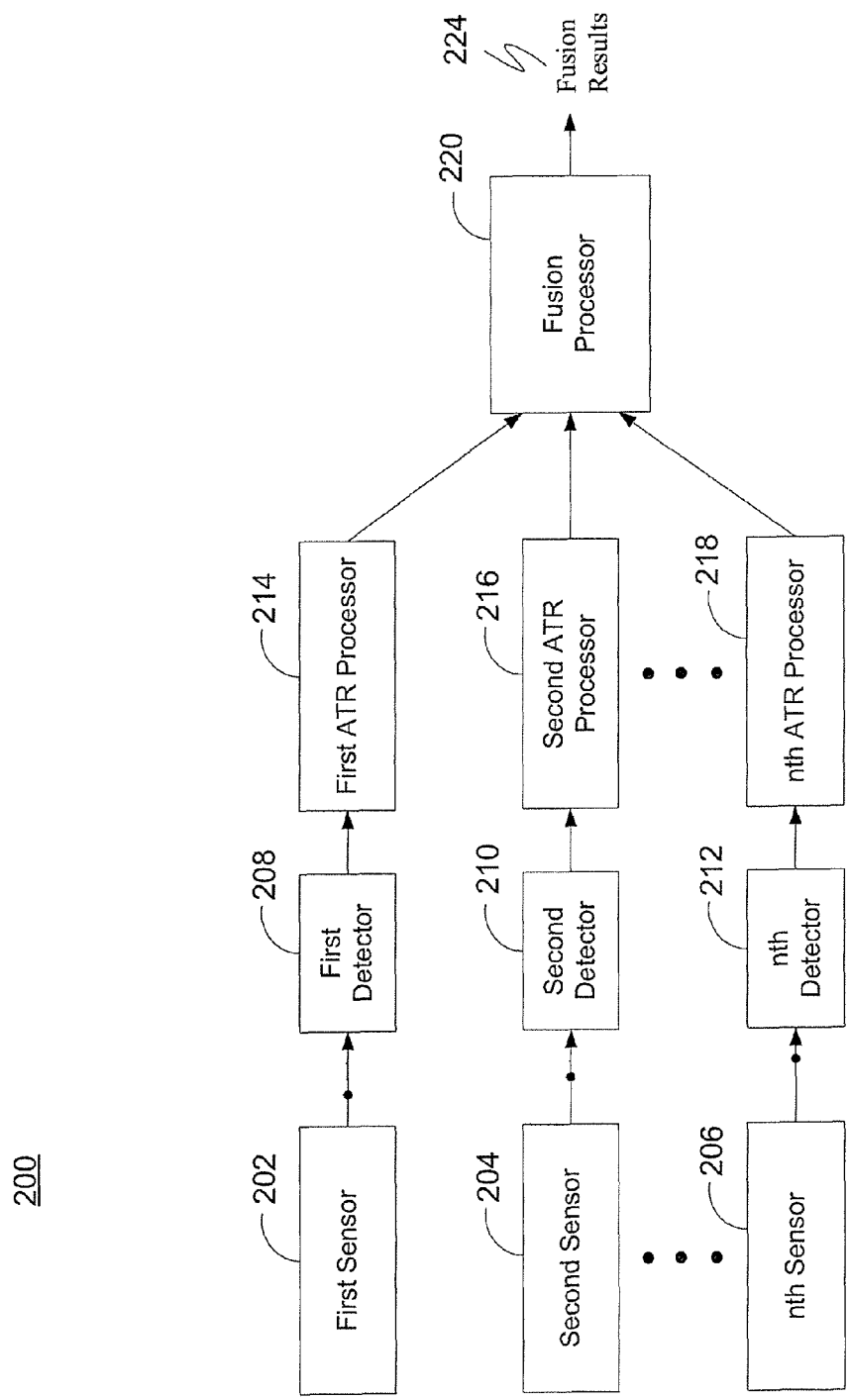
FIG. 2 is a block diagram illustrating an automatic target recognition fusion system utilizing multiple sensors, according to some embodiments of the present invention.

FIG. 2 is a block diagram illustrating an ATR fusion system utilizing multiple sensors in accordance with an embodiment of the present invention. As depicted, an ATR system 200 includes a first sensor 202, a second sensor 204, an "nth" sensor 206, a first detector 208, a second detector 210, an "nth" detector 212, a first ATR processor 214, a second ATR processor 216, a third ATR processor 218 and a fusion processor 220. Also shown in FIG. 2 is INS and sensor pointing data 222 and a fusion results 224, e.g., the fusion classifications output of the ATR system 200.

The first sensor 202, the second sensor 204 and the "nth" sensor 206 are configured to receive radiation from a scene and relay optically processed radiation in the form of signals to their respective ATR processors 214, 216, 218. One of ordinary skill in the art would recognize that the sensors 202, 204, 206 may be of various types, designed with specific materials and components based on the system's requirements. In some embodiments, the materials and components of the sensors 202, 204, 206 may be sensitive to the infrared band of the spectrum, but are not necessarily limited thereto. In some embodiments, the sensors 202, 204, 206 are sensitive to the visible spectrum, or any other band suitable to receive sensor information. By way of example, the sensor types comprise Radar, IR, FLIR, LADAR, and others.

The first detector 208, the second detector 210 and the "nth" detector 212 are each configured to detect and/or scan the images received from the respective sensors 202, 204, 206 and determine regions of interest corresponding to the sets of confidence values and associated azimuth angles for each of the target types. The ATR processors 214, 216, 218 and the fusion processor 220 utilize the regions of interest to constrain the fusion of the multiple ATR scores such that consistent ATR scores are fused.

The first ATR processor 214, the second ATR processor 216 and the "nth" ATR processor 218 are each configured to process and generate ATR scores based on various ATR models implemented in the processors and other components of the ATR system 200. The article by L. M. Novak, G. J. Owirka & W. S. Brower, entitled "An Efficient Multi-Target SAR ATR Algorithm," Conference Record of the Thirty-Second Asilomar Conference on Signals, Systems and Computers (1988, pp. 3-13, Vol. 1, Institute of Electrical and Electronics Engineers), hereby incorporated by reference in its entirety, describes examples of ATR models that may be utilized in the ATR system 200. For example, the first ATR processor 214 may implement a different ATR model than the second ATR processor 216 and/or the "nth" ATR processor 218 such that the fusion of the ATR scores from the ATR processors 214, 216, 218 provides fused scores with greater constraints. In some embodiments, the different ATR models are implemented in a single ATR processor and output distinct ATR scores based on the different ATR models. In some embodiments, the first ATR processor 214, the second ATR processor 216 and the "nth" ATR processor 218 utilize the same ATR model. In the above examples, the ATR processors may utilize same or different ATR models so long as the sensors associated with each of the ATR processors are either at different sensor locations and views or the sensors are of different types.

In some embodiments, the first ATR processor 214, the second ATR processor 216 and the "nth" ATR processor 218 are configured to perform at least part of the functionality inherent in FIG. 3. Accordingly, multiple sensors may each obtain a single image or multiple images to be processed by the first ATR processor 214, the second ATR processor 216 and the "nth" ATR processor 218. In an embodiment, the multiple images may be processed by more than two ATR processors each utilizing different ATR models.

The ATR processors 214, 216, 218, for example, generate ATR scores having fine-grained results. Fine-grained is defined as a maximum of 1-degree increments in azimuth pose angles for the ATR results over 360 degrees. This mandates at least 360 scores for each target type. However, the actual increments of degrees is not fundamental to the invention; that is, the invention can work for any increments of azimuth.

The fusion processor 220 is configured to receive multiple ATR scores from at least two ATR processors ("n" ATR processors shown) and to fuse ATR scores for each consistent relative pose. In an embodiment, the fusion processor 220 is configured to perform at least part of the functionality inherent in FIG. 3. In this embodiment, the "n" ATR processors 214, 216, 218 generate at least two sets of ATR scores utilizing different ATR models. In an aspect, the "n" ATR processors 214, 216, 218 generate at least two sets of ATR scores utilizing the same ATR model.

In an embodiment, the sensors 202, 204, 206 generate more than one image and relay a first image to the first ATR processor 214, a second image to the second ATR processor 216 and an "nth" image to the "nth" ATR processor 218. These images are fused in the fusion processor 220 by corresponding regions of interest determined in the detectors 208, 210, 212. In other embodiments, the first ATR processor 214 and/or the second ATR processor 216 and/or the "nth" ATR processor 218 and/or the fusion processor 220, either together or independently, associate possible detections by corresponding regions of interest, such as in the method associated with FIG. 3. For example, one of ordinary skill in the art would recognize that the association by corresponding regions of interest may be implemented utilizing an algorithm or parts of an algorithm to be executed by one or more of the processors 104, 106, 108. Moreover, one of ordinary skill in the art would understand that the embodiment identified in FIG. 2 is not limited to only obtaining two images, but may be configured to obtain more than two images. Therefore, the ATR scores resulting from the multiple images are fused based on associated regions of interest.

In some embodiments, the fusion processor 220 processes the fine-grained or non-fine-grained data from the ATR processors 214, 216, 218 to obtain the fusion results (classifications) 224. The fusion classifications 224 may be based on multi-source (priors and evidence) Bayesian fusion from real valued classifier confidence scores. That is, relating real value classifier confidence values to effective number of pseudo-counts to enable multinomial distribution model and allow conjugacy with Dirichlet distribution model.

Initially, the Multinomial and Dirichlet distributions, in which the Dirichlet is the conjugate prior and posterior density to the Multinomial is adopted as:

Multinomial Density:

$$Pmnm(N \mid n, \theta) = \frac{n!}{\prod_{j=1}^{m} N_j} \prod_{j=1}^{m} \theta_j^{N_j} \quad (1)$$

Dirichlet:

$$Pdir(\theta; \alpha) = \frac{\prod_{j=1}^{m} \Gamma(\alpha_j)}{\Gamma(\sum_{j=1}^{m} \alpha_j)} \prod_{j=1}^{m} \theta_j^{\alpha_j - 1} \quad (2)$$

where the $N_j$ values are observed "pseudo-counts" in the multinomial distribution, there are m classes, the $\theta_j$ values are the probabilities of each mutually exclusive class, and the $\alpha_j$ values are the parameters of the Dirichlet density. It can be shown that if the priors for a Multinomial are Dirichlet distributed, then the posteriors are also Dirichlet:

$$Pdir(\theta^{t+1}:\alpha^{t+1}) \propto Pmnm(N^{t+1} \mid n^{t+1}, \theta^t)Pdir(\theta^t:\alpha^t) \quad (3)$$

with parameters:

$$\alpha_j^{t+1} = \alpha_j^t + N_j^{t+1} \quad (4).$$

Some properties of this recursive model are that it able to be used to combine prior information with multiple observations, and the expected values of the class probabilities are directly available from the Dirichlet parameters as:

$$E(\theta_j^t) = \frac{\alpha_j^t}{\sum_{j=1}^{m} \alpha_k^t} \quad (5)$$

where the values of the expectation for each class may be used as the Bayesian belief or $P(\omega_j^t) = E(\theta_j^t)$ regarding class state of nature for each possible class $\omega_j$.

This allows assigning relative scores, bounded between 0 and 1, for each category, using a Bayesian evidence accrual strategy. There is also a grouping property of the Dirichlet such that a subset of the $\propto$ class parameter vector may be combined by addition to form a larger inclusive class, with the same expectation property of this larger class obtained by addition of the alphas from the subset:

$$\beta_u = \sum_{j \in u(1,2,\ldots J)} \alpha_j \quad (6)$$

$$E(\theta_u^t) = \frac{\beta_u^t}{\sum_{k=1}^{U} \beta_k^t}. \quad (7)$$

where the new set of hyper-classes is denoted by U.

These are very attractive goals and are potentially useful for any number of pattern recognizer system applications.

In problems such as pattern recognition where a set of single class classifiers may yield values of $N_j$ that are not actually counts, and may in fact be continuously valued, and that typically represent some type of score for the pattern recognition system at to category j for each of the categories, it is not immediately obvious how to apply the Dirichlet-Multinomial model to the problem. This is because the Multinomial distribution typically deals with discrete values while scores for pattern recognizers are generally continuously valued.

The present invention applies the recursions of parameters and pseudo-counts that are consistent with the Multinomial-Dirichlet conjugate relationships, but relaxes the requirement that the pseudo-count evidence in the multinomial actually be integer valued. This works as long as the conjugacy is treated, in terms of the estimation of pattern classes, as above using the conjugate Dirichlet formulae without needing to calculate the probabilities of the observed pseudo counts using the multinomial directly.

A pending co-owned U.S. Patent Publication No. 2010/0106676 discloses a system and method for assigning valuations to the observed pseudo counts, the entire contents of which is hereby incorporated by reference. The present invention then calculates an effective signal to noise ratio of a classifier system. The information in the classifier system is obtained from its confusion matrix, which can be obtained either experimentally or by means of a performance model.

The above cited Patent Application is directed to a method and system for estimating the performance of a classifier system based on a reported confusion matrix, which includes parameters fit to observed confusion matrices, such that the expected performance of decision detection versus the probability of not-in-library reports can be estimated based on the forced decision confusion matrix. The method and system is also applicable to a general methodology for modeling classes of confusers in a statistical manner, which can be extended to modeling clutter severity. Estimating the performance of the classifier system includes providing an observed confusion matrix quantified by in-library category data which characterizes the classifier system and generating an empirical model for the performance of the confusion matrix using two density functions that capture correct and incorrect performance of the in-library categories and their respective parameters, and a further density function characterizing an in-library to out-of-library probability parameter. Then, predicting, based upon the empirical model, how well the classifier system will perform when presented with out-of-library data and outputting the prediction to estimate the performance of the classifier system.

The equation in the above cited Patent Application for the system confusion matrix (CM) Probability of correct classification (Pc) as a function of the signal term $A_0$ and the noise term $\sigma_1$ is:

$$P_c = \frac{A_0^2 + 1}{A_0^2 + (m-1)\sigma_1^2 + 1}. \tag{8}$$

where m is the number of classes in the confusion matrix and the other terms refer to parameters of effective signal and noise for the target distributions in the confusion matrix.

The effective signal to noise ratio is $$SNR = \frac{A_0}{\sigma_1}.$$

The value of SNR' can vary depending on the absolute values of $A_0$ and $\sigma_1$. The equation for the effective limiting SNR, based on the above confusion matrix formula for $P_c$, is $$SNR' = \frac{(m-1)(P_c)}{(1-P_c)} \tag{9}$$

This is a limiting (upper bound) value as the values of both and it is solved for the value of $\sigma_1$ that gives the specified (modeled or empirically determined) Pc for an m class confusion matrix, and find the maximum SNR' value.

The value of $$SNR' = \frac{A_0}{\sigma_1'}$$

asymptotes as $A_0$ becomes large, and so this allows an estimate of SNR' that characterizes a confusion matrix as:

$$SNR' = \lim_{A_0 \to \infty} \left(\frac{A_0}{\sigma_1'}\right)^2 \tag{10}$$

The Scaled Multinomial-Dirichlet Bayesian method utilizes discrete pseudo-counts for each class j based on classifier scores. The unit of "counts" is in bits. The maximum number of possible counts is expressed as the system classifier capacity, which is expressed analogously to an information theoretic channel capacity as:

$$C=0.5 \log(1+SNR') \tag{11}$$

where C, the channel capacity of the system represented by the pattern classifier confusion matrix, is expressed in bits per report. Prior to the assignment of pseudo-counts, the system normalizes the output scores $S_j$ for each single class classifier for class j. This can be done by transforming the scores to a standard normal distribution function $F_j$ as:

$$p'_j = \frac{S_j}{\int_{-\infty}^{\infty} S_j dS_j} \tag{12}$$

$$p''_j = \frac{p'_j - \mu_j}{\sigma_j} \tag{13}$$

$$F''_j(S''_j) = \int_{-\infty}^{S''_j} p''_j(s) ds \tag{14}$$

The fusion system then assign pseudo-counts based on the number of discrete bits of information associated with each pattern class score. These discrete bits are denoted as $C_j$. The assignment of pseudo-counts is based on a function that translates the values of $F''_j (S''_j)$ into effective bits. In some embodiments, the present invention performs this translation using a scaling of the system capacity via the cumulative distribution functions for each j:

$$C_j F''_j(S''_j)C \tag{15}$$

These are in units of bits and in general are real valued. To maintain strictly discrete units of pseudo-counts one may round to the nearest whole number of bits:

$$C'_j = \text{round}(C_j) \tag{16}$$

The values of $\alpha_j^t$ are then incremented at each time increment t (equivalent to an observation or measurement increment) with the values of $C'_j$ at that time increment, denoted by $C'_j{}^t$:

$$\alpha'_j{}^{t+1} = \alpha'_j{}^t + C'_j{}^{t+1} \tag{17}$$

Within this algorithm the values of $C'_j{}^t$ therefore serve as "pseudo-counts" in the same manner as actual counts operate in a multinomial observation. Note that the system may be initialized with uniform non-informative priors ($\alpha'_j{}^0 = 1$ for j), or with other priors. The values of $P(\omega_j{}^t)$ are thereby obtained using a method that relates Bayesian prior knowledge, pattern classifier information capacity, and individual scores for each class, in a way that preserves the discrete mathematical formalism of the multinomial-Dirichlet recursion.

This method is potentially recursive over time and multiple sensors. That is, the values of t can be multiple sequential observations using the same sensor, or they can denote different sensor-classifiers, or both in any desired combination.

In the case that multiple sensors' evidence is being fused, b1, b2, bL for L sensors. In this case, the evidence for the class types is normalized in the same way as previously, with the notation j,bl indicating the jth class for the bl sensor:

$$F''_{j,bl}(S''_{j,bl}) = \int_{-\infty}^{S''_j} p''_{j,bl}(s) ds \tag{18}$$

$$C_{j,bl} = F''_{j,bl}(S''_{j,bl})C_{bl} \tag{19}$$

$$C'_{j,bl} = \text{round}(C_{j,bl}) \tag{20}$$

The values of pseudo-counts are then set to $C'_{j,bl}$ at each time increment (equivalent to an observation or measurement increment) for each sensor, and denoted as $C'_{j,bl}{}^t$.

These pseudo-counts are then used as previously to increment the Dirichlet alpha vector of class evidence parameters:

$$\alpha'_{j,bl}{}^{t+1} = \alpha'_{j,bl}{}^t + C'_{j,bl}{}^t \tag{21}$$

At any time increment the values of the alpha parameters fused over all sensors for each class is available:

$$\alpha'_j{}^t = \alpha'_{j,b1}{}^t + \alpha'_{j,b2}{}^t + \ldots + \alpha'_{j,bL}{}^t \tag{22}$$

The value of the expectation of the multinomial probability (Bayesian belief) for each class is then available as:

$$E(\theta_j'^{,t}) = \frac{\alpha_j'^{,t}}{\sum_{k=1}^{m} \alpha_k'^{,t}} \quad (23)$$

where $P(\omega_j^t) = E(\theta_j'^{,t})$.

Initialization of the alpha parameters coincides in a Bayesian sense with importation of prior beliefs. Typical priors are the uniform (non-informative) prior where $\alpha_j'^{,t=0} = 1$ for all j classes, or the Jeffreys prior where $\alpha_j'^{,t=0} = 5$, for all classes.

There is no limit to the number of sensors that can be combined; an advantage of this approach is that all prior and sensor evidence is ultimately expressed in the same currency, that of bits, and hence its generality for fusion system applications.

FIG. 3 is an exemplary flow diagram illustrating a fusion method, executed on one or more processors, for classifying a target type in a set of target types from a single image or multiple images, from a single or multiple observations, according to some embodiments of the present invention.

The scaled multinomial-Dirichlet Bayesian evidence fusion method of the present invention, executed on one or more processors, applies a Bayesian categorical framework using the Dirichlet conjugate prior-posterior density to the multinomial observation density. The term for "counts" in the multinomial density is substituted by a term for "pseudo-counts," which is expressed in bits of information for each class score. These can then be combined over both time (or number of observations) and sensors, for each class. The Dirichlet parameter vector permits estimates of the Bayesian belief in each class, based on the combined prior belief and set of observations.

As showing in block 302, the evidence from one or more classifiers is obtained, and the prior distribution of Bayesian beliefs of class types of the target is also obtained or estimated. The evidence as used here refers to measurements and processing results applied to such measurements such that support is given for or against a belief in a particular state of nature. The evidence may come from one or more classifiers. Alternatively or in addition, the evidence may be obtained from one or more classifier and from different observation. Moreover, different observations may be obtained from the same classifier using a different field of view or different types of classifiers having the same or different field of views.

In a pattern recognition context, a potential target includes different class types, here represented as distribution of Bayesian beliefs of class types of the target. For example, a prior belief system for types of birds that are expected to be seen on a bird watch excursion may be 0.9 sparrows, 0.04 hummingbirds, 0.02 eagles, and 0.04 any other type of bird. After making sightings by non-experts, the posterior Bayesian beliefs may be 0.95 sparrows, 0.02 hummingbirds, 0.01 eagles, and 0.02 other birds.

In block 304, information about recognition accuracy of each of the classifiers is obtained and recognizer capacity is determined from the report for the recognition accuracy and the total number of possible categories or types, for example, as in Equations (8) to (11). A multinomial distribution model is then determined in block 306, based on the obtained evidence and the information about recognition accuracy and capacity. In block 308, the prior distribution of Bayesian beliefs is represented by a Dirichlet distribution model, and the Dirichlet distribution model is applied to the multinomial distribution model to obtain a posterior (updated) Dirichlet distribution model, for example, as in Equations (1) through (7), in block 310.

In block 312, new evidence is obtained. The new evidence may be obtained from different classifiers, from the same classifier but using different observation, or in a combination of both. A new multinomial distribution model is then determined, based on the obtained new evidence and the information about the recognition accuracy and capacity, in block 314. The obtained posterior (updated) Dirichlet distribution model is then applied to the new multinomial distribution model to obtain a new posterior (enhanced) Dirichlet distribution model, in block 316. That is a recursive method that is used to combine prior information with multiple observations. That is, the executed process may be recursive over time and multiple sensors. In other words, the values can be multiple sequential observations using the same sensor, or they can denote different sensor-classifiers, or both in any desired combination. The recursion may continue until a specified minimum confidence or a specified maximum number of observations is reached.

The invention then utilizes the parameters of the new posterior (updated) Dirichlet distribution model to estimate Bayesian confidence values for each class or category, in block 318. As described above, a Bayesian confidence value may be, for example, a percentage, estimate or likelihood. The expected values of the class probabilities are directly available from the Dirichlet parameters, as depicted in Equation (5) above. In block 320, the invention then utilizes the estimated Bayesian confidence values for each class to classify the target, for example using Equations (5) to (7).

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A fusion method, implemented by one or more processors, for classifying a target having a plurality of class types, the method comprising:
    obtaining evidence from one or more classifiers;
    obtaining prior distribution of Bayesian beliefs of the class types of the target;
    obtaining information about recognition accuracy and capacity of each of the one or more classifiers;
    determining multinomial distribution model, based on the obtained evidence and the information about recognition accuracy and capacity;
    representing the obtained prior distribution of Bayesian beliefs by a Dirichlet distribution model;
    applying the Dirichlet distribution model to the determined multinomial distribution model to obtain an updated Dirichlet distribution model;
    obtaining new evidence;
    determining a new multinomial distribution model, based on the obtained new evidence and the information about recognition accuracy and capacity;
    applying the updated Dirichlet distribution model to the new multinomial distribution model to obtain a new updated Dirichlet distribution model;
    using parameters of the new updated Dirichlet distribution model to estimate Bayesian confidence values for each of the plurality of class types; and
    using the estimated Bayesian confidence values for each of the plurality of class types to classify the target.

2. The method of claim 1, wherein the evidence is obtained from said one or more classifiers using different observations.

3. The method of claim 2, wherein said different observations are obtained from the same classifier using different field of views.

4. The method of claim 2, wherein said different observations are obtained from the different classifiers using the same field of view.

5. The method of claim 1, wherein the evidence is obtained from said one or more classifiers using same observation.

6. The method of claim 1, wherein said obtaining information about recognition accuracy and capacity comprises determining the capacity from a report for the recognition accuracy and a total number of possible class types.

7. The method of claim 1, further comprising recursively repeating obtaining new evidence; determining a new multinomial distribution model, based on the obtained new evidence and the information about recognition accuracy and capacity; and applying the updated Dirichlet distribution model to the new multinomial distribution model to obtain a new updated Dirichlet distribution model, until a predetermined minimum confidence or a predetermined maximum number of observations is reached.

8. A fusion method, implemented by one or more processors, for classifying a target having a plurality of class types, the method comprising:

obtaining evidence from one or more classifiers, the evidence represented by a plurality of scores from the one or more classifiers;

representing the obtained evidence in a Bayesian context, wherein Bayesian beliefs are obtained from the plurality of scores;

obtaining new evidence, the new evidence represented by a plurality of new scores from the one or more classifiers;

representing the obtained new evidence in an enhanced Bayesian context, wherein enhanced Bayesian beliefs are obtained from the plurality of new scores;

combining the plurality of scores and the plurality of new scores over time;

combining the evidence and the new evidence over multiple times; and using the combined scores and the combined evidence for each of the plurality of class types to classify the target.

9. The method of claim 8, wherein the evidence is obtained from said one or more classifiers using different observations.

10. The method of claim 9, wherein said different observations are obtained from the same classifier using different field of views.

11. The method of claim 9, wherein said different observations are obtained from the different classifiers using the same field of view.

12. The method of claim 8, wherein the evidence is obtained from said one or more classifiers using same observation.

* * * * *